: US006992709B1

United States Patent
Raj et al.

(10) Patent No.: US 6,992,709 B1
(45) Date of Patent: Jan. 31, 2006

(54) METHOD AND APPARATUS FOR HIGH-SPEED BROADBAND ILLUMINANT DISCRIMINATION

(75) Inventors: Kannan Raj, Chandler, AZ (US); Tonia Morris, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/258,546

(22) Filed: Feb. 26, 1999

(51) Int. Cl.
*H04N 9/73* (2006.01)
*G03B 7/00* (2006.01)

(52) U.S. Cl. .............................. 348/227.1; 348/228.1; 396/225

(58) Field of Classification Search .............. 348/228.1, 348/227.1, 226.1, 225.1; 396/225, 223.1
See application file for complete search history.

(56) References Cited

U.S. PATENT DOCUMENTS

| | | | | |
|---|---|---|---|---|
| 4,584,598 A | * | 4/1986 | Kutaragi ................... | 348/226.1 |
| 4,653,925 A | * | 3/1987 | Thornton, Jr. .............. | 356/419 |
| 5,016,094 A | * | 5/1991 | Kaneko .................... | 348/226.1 |
| 5,021,875 A | * | 6/1991 | Iida et al. ................. | 348/227.1 |
| 5,023,704 A | * | 6/1991 | Hieda et al. .............. | 348/227.1 |
| 5,099,313 A | * | 3/1992 | Suemoto et al. .......... | 348/226.1 |
| 5,270,802 A | * | 12/1993 | Takagi et al. ............. | 348/223.1 |
| 5,691,772 A | * | 11/1997 | Suzuki .................... | 347/223.1 |
| 5,799,216 A | * | 8/1998 | Teremy et al. ............. | 396/225 |
| 5,805,213 A | * | 9/1998 | Spaulding et al. ........ | 348/222.1 |
| 6,519,002 B1 | * | 2/2003 | Tomaszewski ........... | 348/226.1 |
| 6,545,710 B1 | * | 4/2003 | Kubo et al. .............. | 348/223.1 |

* cited by examiner

*Primary Examiner*—Andrew Christensen
*Assistant Examiner*—Tia M. Harris
(74) *Attorney, Agent, or Firm*—Blakely, Sokoloff, Taylor & Zafman LLP (57) ABSTRACT

An apparatus for determining a type of an illuminant including a spectrum diffraction unit and a sensor coupled to the spectrum diffraction unit. An illuminant discrimination unit is coupled to the sensor and configured to receive a set of signals representative of a set of spectral components in the illuminant and to determine the type.

12 Claims, 9 Drawing Sheets

Illuminant Condition Log and Independent Output Code Generation

FIG. 9

Illuminant Condition Log and Relative-Best Output Code Generation

METHOD AND APPARATUS FOR HIGH-SPEED BROADBAND ILLUMINANT DISCRIMINATION

BACKGROUND INFORMATION

1. Field of the Invention

This invention is related to the field of use of image capture. More particularly, this invention is directed to a method and apparatus for determining the nature of the illuminant during still and video image capture.

2. Background

Video and still image capture using a digital camera has become very prevalent. Video capture may be used for such applications as video conferencing, video editing, smart vision and distributed video training. Still image capture with a digital camera may be used for such applications as photo albums, photo editing, and compositing. Many components of hardware and software need to work seamlessly to both get the video data (also referred to as a video "stream") or the still image data from the hardware through the various layers of software on the PC and made visible on a display medium.

Figure 1:
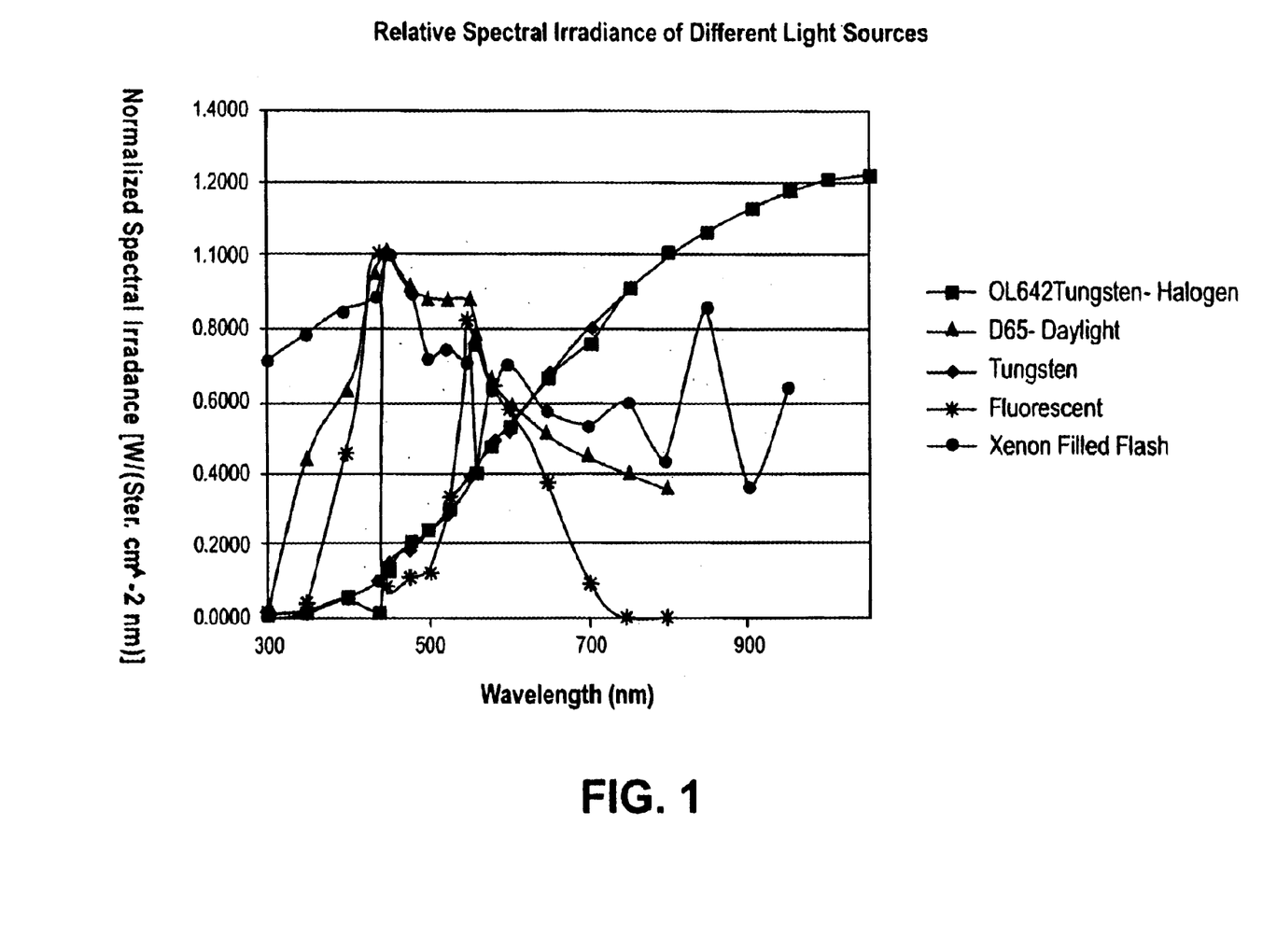
FIG. 1 is a spectral irradiance diagram of different light sources.

Digital cameras are typically expected to operate under a variety of scene illuminations. Some common illuminant conditions are fluorescent lighting, day light (also known as D65 lighting), and tungsten illumination. These light sources have different spectral (wavelength) components, as shown in FIG. 1. For example, the tungsten light source has a stronger red wavelength component (600 nm to 700 nm) compared to the blue wavelength component (400–480 nm), and green wavelength component (480–580 nm). In comparison, D65 lighting has stronger blue and green wavelength components with a relatively weaker red wavelength component. Imaging under these conditions requires careful exposure settings to establish linear region of operation of the digital camera within the photospace in all color channels. Part of the challenge is in obtaining color balance and accurate reproduction of color and tone under these different illuminating conditions. If the type of illuminant is known, then the correct exposure controls and algorithms can be applied to obtain accurate colors in images.

Currently, many imaging systems rely on pre-metering information and a set of histograms to identify the relative strengths in the red, green and blue channels to identify the nature of the illuminant. This process consumes time and sets a lower bound on the pre-metering time.

SUMMARY

What is disclosed is an apparatus for determining a type of an illuminant including a spectrum diffraction unit and a sensor coupled to the spectrum diffraction unit. An illuminant discrimination unit is coupled to the sensor and configured to receive a set of signals representative of a set of spectral components in the illuminant and to determine the type.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention provides a system for discriminating among different illuminants. The system provides an approach to identifying the nature of the illuminant. Previous approaches use a histogram computation during pre-metering to identify the illuminant, which adds to the time required to set the appropriate exposure controls and also requires that there is sufficient signal level to make the estimation. Also, a scene based illumination method introduces some level of ambiguity because the light source spectral content will be convolved with the spectral reflectance from the scene and it is very difficult to deconvolve the two for a variety of imaging situations.

The present invention is independent of the information on the active imaging area and the illuminant is identified before the pre-metering is done, providing some time savings in the shutter to shutter time. Another advantage is that the illuminant identification can be enabled all the time and values can be stored in a register. Any change in illuminant condition will automatically flag the change and new register values will be provided to the exposure table, which chooses the appropriate look up tables for image capture.

In one embodiment, the sensing elements and circuits needed to implement the discrimination circuit are located on a sensor in the digital camera. In another embodiment, the sensing discrimination circuit is implemented as a separate element in the digital camera.

Figure 2:
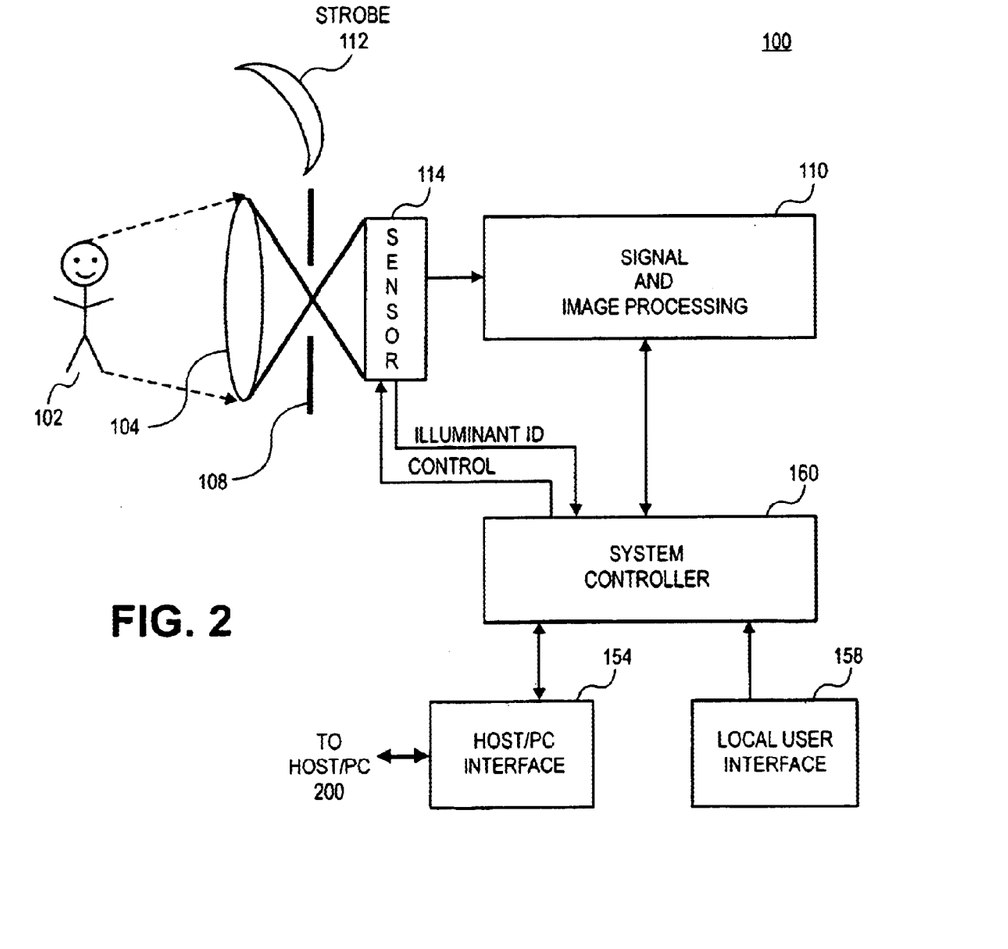
FIG. 2 is a block diagram of an imaging system configured in accordance with one embodiment of the present invention.

An embodiment of the invention as an imaging system 100 is shown as a logical block diagram in FIG. 2. Imaging system 100 includes a number of conventional elements, such as an optical system having a lens 104 and aperture 108 that is exposed to the incident light reflected from a scene or object 102. The optical system properly channels the incident light towards a sensor array 114 that generates sensor signals in response to an image of object 102 being formed on sensor array 114. The various control signals used in the operation of sensor array 114, such as a clock signal, a RESET/SAMPLE signal and an ADDRESS signal, are generated by a system controller or sequencer 160. System controller 160 also receives an ILLUMINANT ID signal that identifies the illuminant from sensor 114. System controller 160 may include a microcontroller or a processor with input/output (I/O) interfaces that generates the control signals in response to instructions stored in a non-volatile programmable memory. Alternatively, a logic circuit that is tailored to generate the control signals with proper timing can be used. System controller 160 also acts in response to user input via a local user interface 158 (as when a user pushes a button or turns a knob of system 100) or a host/PC interface 154 to manage the operation of imaging system 100.

To obtain images, a signal and image processing block 110 is provided in which hardware and software operate according to image processing methodologies to generate captured image data in response to receiving the sensor signals. Optional storage devices (not shown) can be used aboard system 100 for storing the captured image data. Such local storage devices may include a removable memory card. Host/PC interface 154 is included for transferring the captured image data to an image processing and/or viewing system such as a computer separate from imaging system 100. Imaging system 100 can optionally contain a display means (not shown) for displaying the captured image data. For instance, imaging system 100 may be a portable digital camera having a liquid crystal display or other suitable low power display for showing the captured image data.

Figure 3:
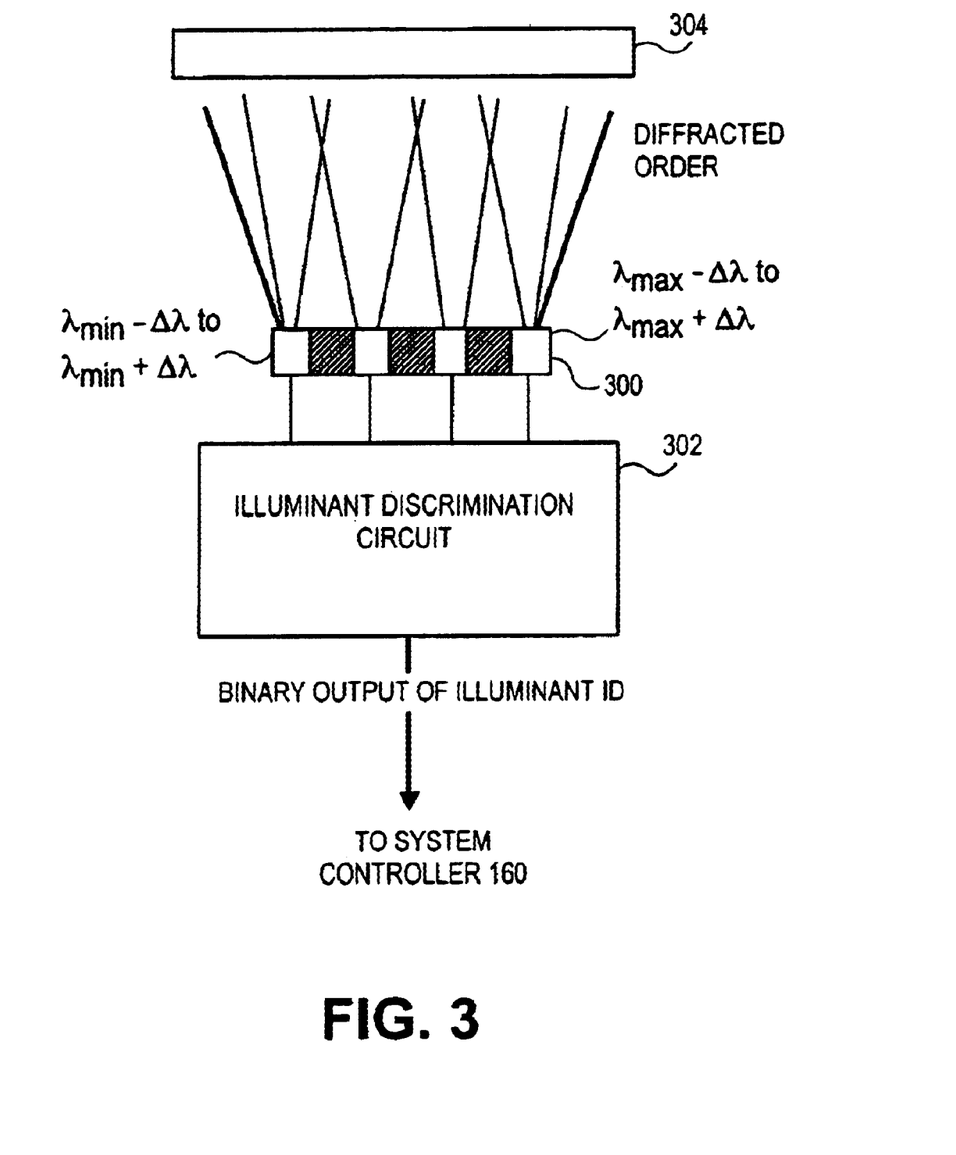
FIG. 3 is a block diagram of an illumination detection system configured in accordance with one embodiment of the present invention.

FIG. 3 is a block diagram of an illuminant detection sensor array 300 and an illuminant discrimination circuit 302 contained in sensor 114 and used to identify illuminants. The system uses an angular spread of the spectrum of an illuminant within a diffraction order to identify the illuminant. The diffracted light with the wavelength spread is incident on illuminant detection sensor array 300, which in one embodiment is a one dimensional row of pixels. Further, each pixel collects all the light within a narrow wavelength band of 2Δλ. In one embodiment, Δλ has the value of 20 nm. A diffraction unit 304, which contains a plastic lens, binary or multi-level phase grating and an aperture or baffle to block higher diffraction orders, is used to provide the diffracted light source used in manipulating the light source provided to illuminant detection sensor array 300.

Each pixel would receive different amounts of light depending on the relative strength of the wavelength components. Depending on the resolution or sensitivity needed for the detection circuit, the number of pixels needed and the spacing between pixels can be chosen accordingly. Thus, in other embodiments, additional pixels may be used for illuminant detection sensor array 300 to make the sensor a multi-directional sensor array and/or to add more sensors for the array. The total of captured light energy can also be adjusted by adding/removing pixels and/or changing Δλ to obtain a desired resolution of the spectrum.

Illuminant discrimination circuit 302 allows the detection of any illuminants that are present in the field of view of imaging system 100. Illuminant discrimination circuit 302 receives signals from illuminant detection sensor array 300. These signals represent the amount of light within an established spectrum of electromagnetic radiation, broken down into discrete bands.

Figure 4:
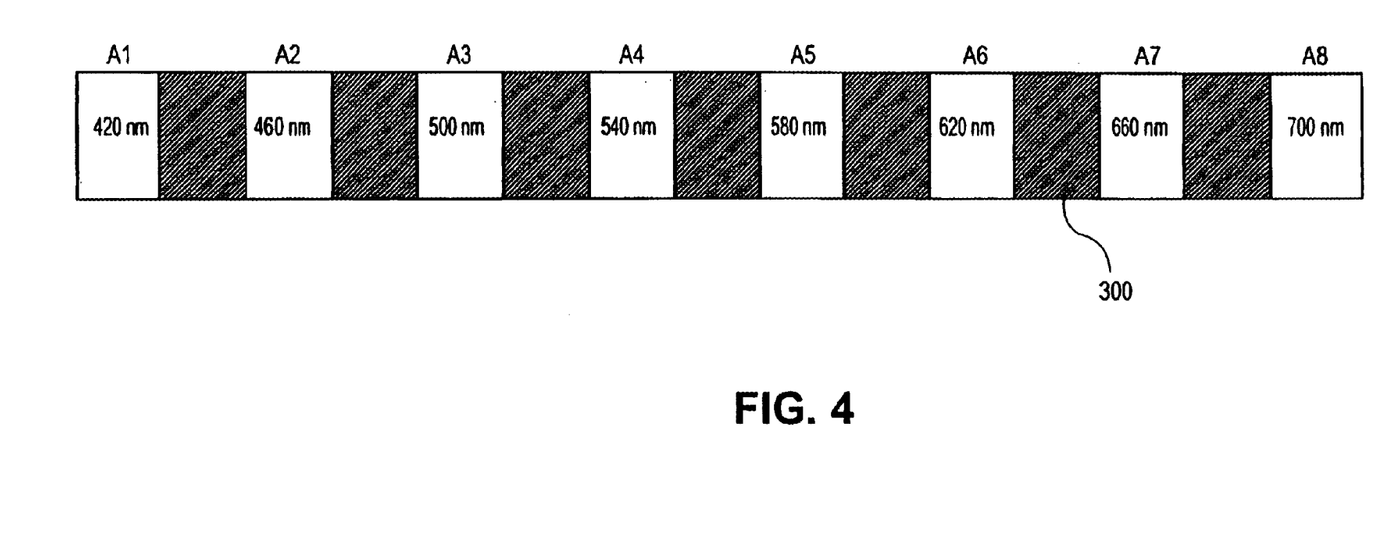
FIG. 4 is a block diagram of a set of pixel sensors used to sample a spectrum.

Sampling of the spectrum can be done in several ways. FIG. 4 illustrates one implementation with 8 discrete pixels that are spaced uniformly apart. The center wavelengths sampled within each window are shown sampling the 420 nm, 460 nm, 500 nm, 540 nm, 580 nm, 620 nm, 660 nm, and 700 nm wavelengths. In this implementation, Δλ is equal to 20 nm. Thus, the total spectrum that is covered is 400 nm to 720 nm.

Diffracted light falling within each window produces a current or a voltage response from each pixel in illuminant detection sensor array 300. Assigning the value of the detected response to each of the pixels in illuminant detection sensor array 300 from left to right as A1 through A8, Table 1 contains the parameters used in one embodiment of the invention for identifying each illuminant and the corresponding binary output. The parameters are obtained from Color Science: Concepts and Methods, Ouantitative Data and Formulae, Gunter Wyszecki & W. S. Stiles, pages 18–28, $2^{nd}$ Edition, Wiley-Interscience Publication, 1982.

TABLE 1

Illuminant Identification Parameters/Output

| Type of Light Source | Spectrum Evaluation | Output Code |
| --- | --- | --- |
| D-65 Day Light | A1 < A2 AND A2 > A3 > A4 > A5 > A6 > A7 > A8 AND A1/A8 > 1 | 10000000x2 |
| Tungsten | A1 < A2 < A3 < A4 < A5 < A6 < A7 < A8 | 01000000x2 |
| Carbon Arc | A1 > A2 > A3 > A4 > A5 > A6 AND A6/A7 > 0.9 AND A7/A8 > 0.9 | 00100000x2 |
| Mercury Vapor | A1 > A2 > A3 AND A4 > A3 AND A5 > A3 AND A4 > A8 | 00010000x2 |
| Fluorescent | A1 > A3 AND A4 > A3 AND A4/A5 < A4/A3 | 00001000x2 |
| Xenon filled Flashtube | A1/A2 > 0.8 AND A3/A4 > 0.8 AND A1 > A2 > A3 > A4 > A5 > A6 > A7 > A8 | 00000100x2 |

Figure 5:
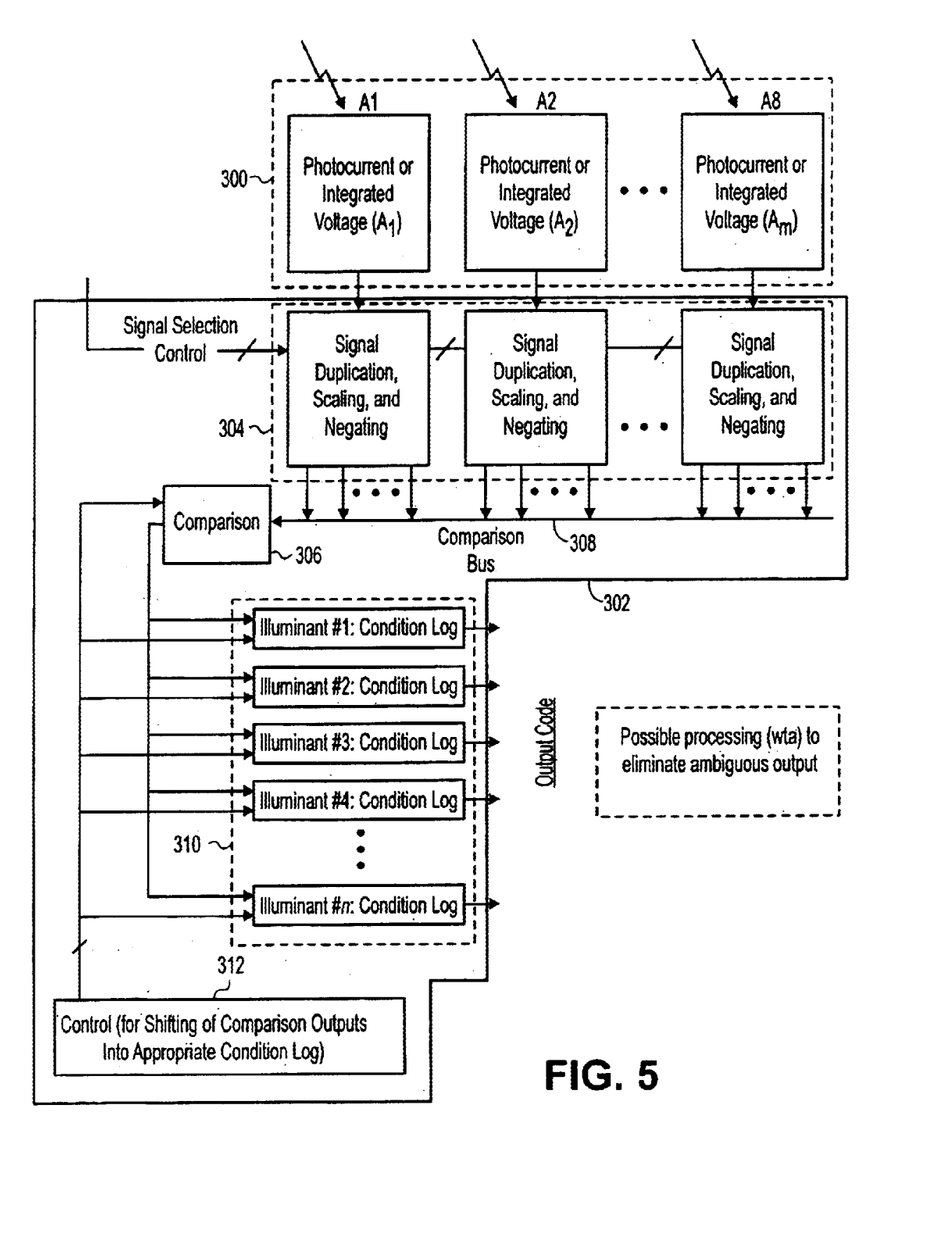
FIG. 5 is a block diagram of an illuminant detection circuit configured in accordance with one embodiment of the present invention.

FIG. 5 illustrates one embodiment of illuminant discrimination circuit 302 coupled to illuminant detection sensor array 300. Illuminant discrimination circuit 302 contains a set of signal duplication/scaling/negating units 304 with output coupled to a comparison unit 306 over a comparison bus 308. The output from comparison unit 306 is fed to a set of illuminant condition logs 310, which holds the intermediate values based on comparisons and then computes the final output code and transfers the detected illuminant code to system controller 160.

The decision circuit implements a series of comparisons using comparison unit 306 among the discrete wavelength values captured by illuminant detection sensor array 300. The results of these comparisons are stored within a set of illuminant condition logs and logic for detecting when appropriate conditions are met, which in one embodiment is an array of shift registers. As described below, there is one shift register for each potential illuminant. The shift register for each illuminant is the same length (e.g., contains enough bits) as the number of specific conditions required to discriminate that particular illuminant.

As described below, comparison unit 306 may be implemented to work with continuous-time current-mode processing or sampled voltage-mode processing implementations. Each pixel (e.g., wavelength detector) in illuminant detection sensor array 300 creates a signal, which is selectively passed as a positive or negative value depending on the comparison, and may be scaled to perform some of the conditional tests. The output of the comparison for each selected inputs represents the existence of a condition, which is passed into the appropriate set of shift registers in the set of illuminant condition logs 310. Once all conditions have been tested and the results loaded into the set of illuminant condition logs 310, the number of detected conditions for each illuminant is analyzed to discriminate among the possible sensed illuminants.

Figure 6:
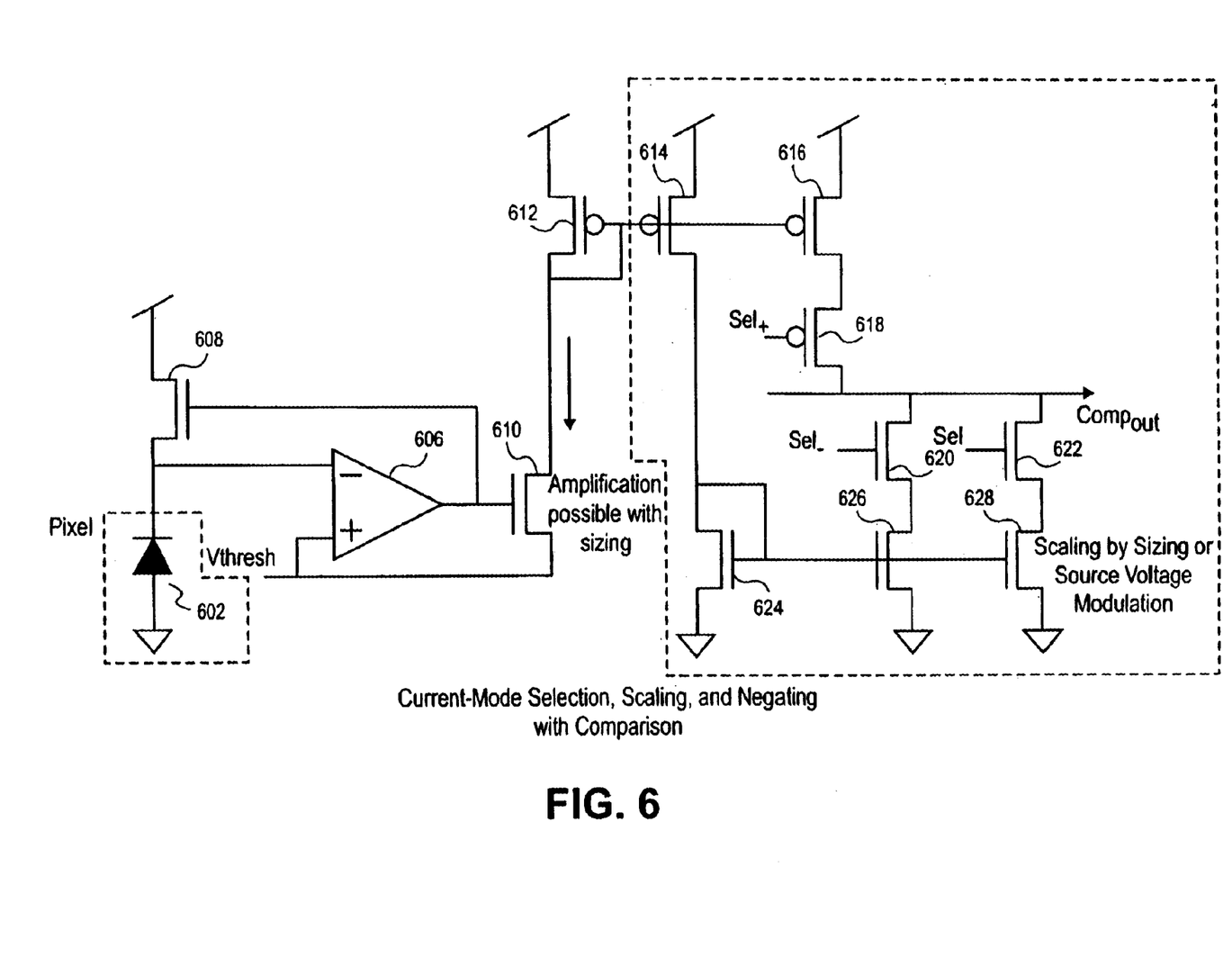
FIG. 6 is a current-mode selection/scaling/negating unit in the illuminant detection circuit of FIG. 5 configured in accordance with one embodiment of the present invention.

FIG. 6 contains a current-mode selection/scaling/negating unit 600 with a photodiode 602 and a transistor 608 connected to an operational amplifier 606. A transistor 612 and a transistor 610 are used for signal reproduction with optional signal amplification. Current-mode selection/ scaling/negating unit 600 also contains a comparison preprocessor unit 604 with a first mirroring transistor 614 coupled to a transistor 624 and a second mirroring transistor 616. A positive selection transistor 618 receives a Sel$_+$ signal, while a negative selection transistor 620 receives a Sel$_-$ signal. An amplified negative selection transistor 622 is used to provide a scaled negative input from the Sel$_{-a}$ signal. Negative selection transistor 620 and amplified negative selection transistor 622 are coupled to a transistor 626 and a transistor 628, respectively. This combination of transistors allows the flexibility of selecting how this value is being compared to other values in the array.

The selection transistors are used to receive an input from the pixel and provide it as a positive or a negative value. The scaling transistors are used to scale the positive or negative value if needed for comparison purposes. For example, in the detection of Carbon Arc light sources, there is a need to compare A6 and A7 to determine if A6/A7>0.9. Thus, the system needs to determine whether A6>(0.9)A7. In this case, either the signal for A6 may be amplified or the signal for A7 may be attenuated by 10% such that the comparison may be made.

Figure 7:
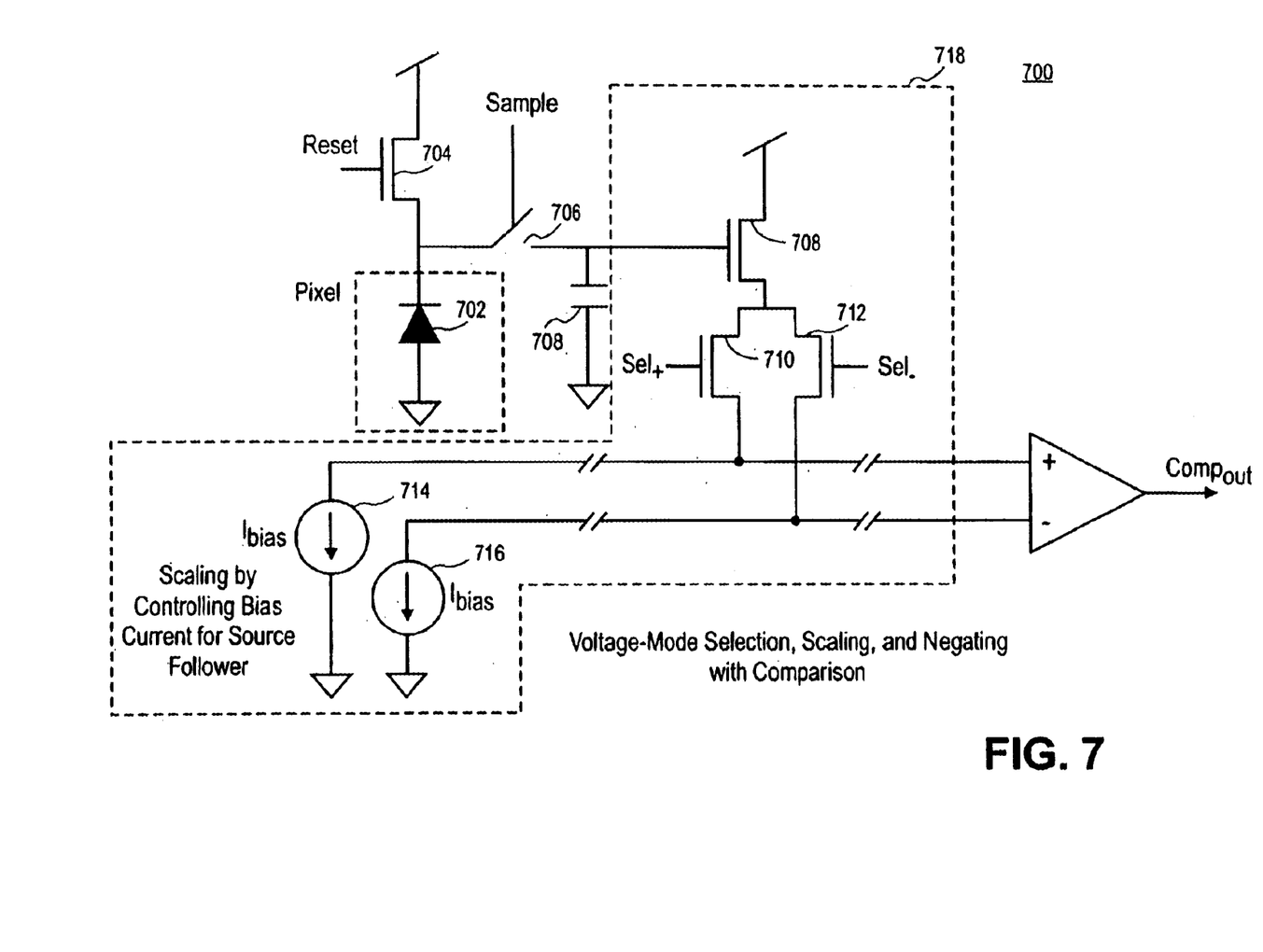
FIG. 7 is a voltage-mode selection/scaling/negating unit in the illuminant detection circuit of FIG. 5 configured in accordance with one embodiment of the present invention.

FIG. 7 contains a voltage-mode selection/scaling/negating unit 700 with a photodiode 702 with a reset transistor 704. A sample switch 706 is used to capture the signal received from photodiode 702 in a capacitor 708. The captured signal is fed to a comparison pre-processor unit 718 to amplify, scale, and negate the input signals for comparison purposes.

Comparison pre-processor unit 718 includes a positive selection transistor 710 and a negative selection transistor 712 connected to a positive selection current bias source 714 and a negative selection current bias source 716, respectively. The comparison may then be performed at comparison unit 720, which is a part of comparison unit 306.

A control unit 312, which may be a state machine, is used to control the sequencing of selected inputs from set of signal duplication/scaling/negating units 304 for the comparison operation over comparison bus 308 and the shifting of the comparison outputs into the appropriate shift registers in set of illuminant condition logs 310. Once all conditions have been tested through the comparison of the detected values at each wavelength, the stored condition logs in set of illuminant condition logs 310 is used to determine which illuminant conditions have been met, thus creating an output code that discriminates among the different illuminant possibilities.

Figure 8:
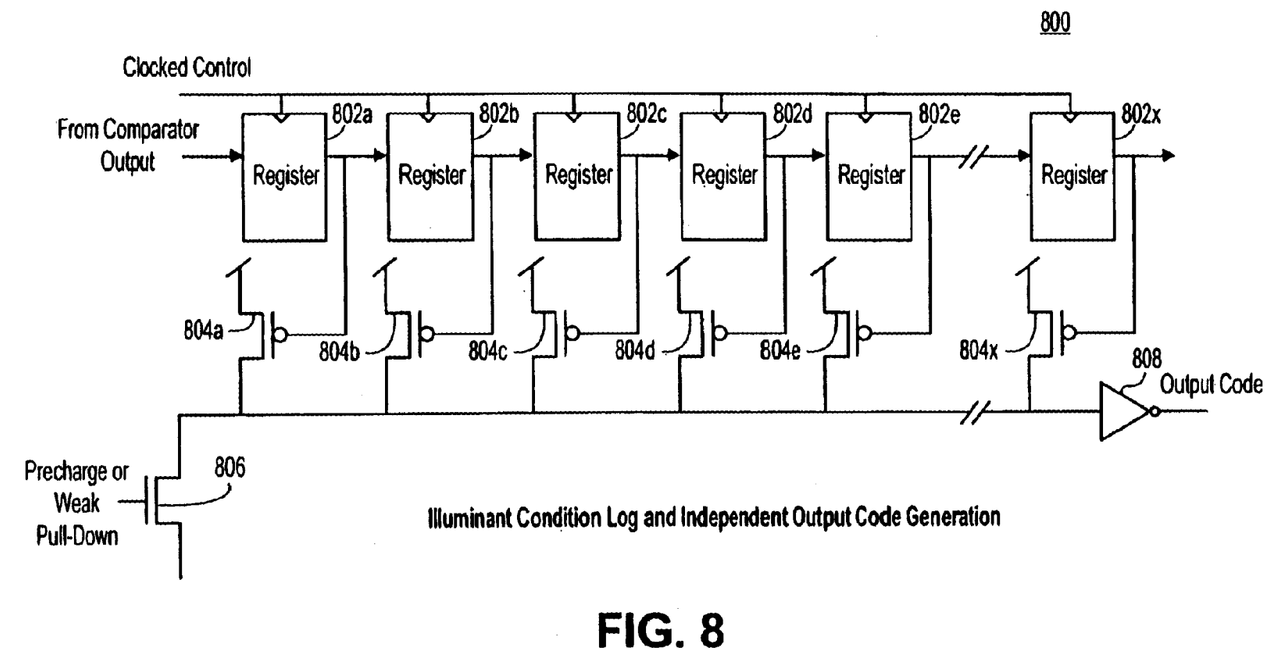
FIG. 8 is an illuminant condition log in the illuminant detection circuit of FIG. 5 configured in accordance with one embodiment of the present invention.

In one embodiment, the output code can represent an all-or-none decision for each illuminant, whereby the output is asserted if ALL conditions exist, and is not asserted when any ONE of the conditions fails. FIG. 8 illustrates an illuminant condition log 800, which includes a set of registers 802 and an associated set of output transistors 804, which create a NAND function. Illuminant condition log 800 also contains a precharge or weak pull-down transistor 806. Illuminant condition log 800 also contains a logical NOT gate 808 to invert the output of set of output transistors 804.

Figure 9:
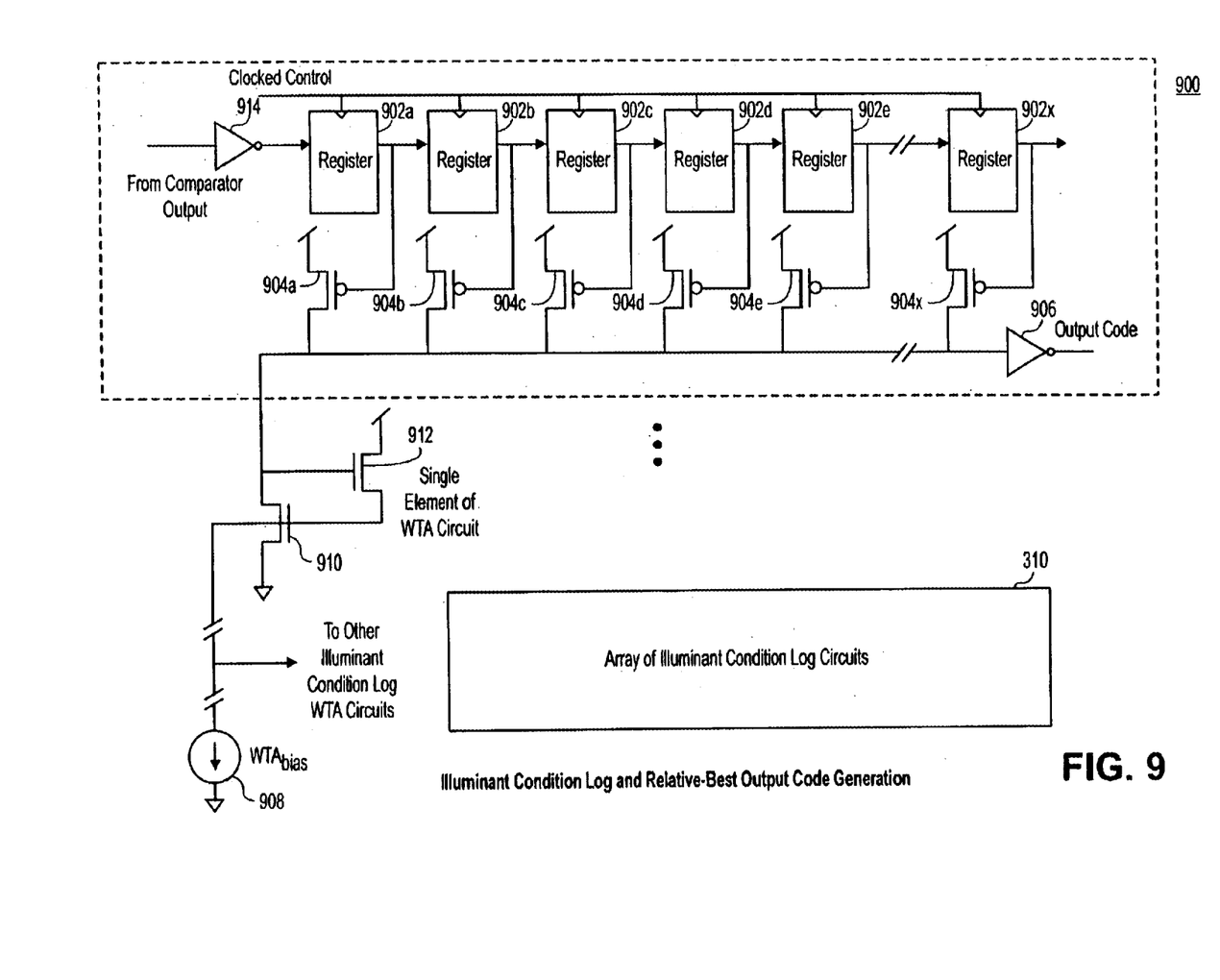
FIG. 9 is a winner-takes-all illuminant condition log in the illuminant detection circuit of FIG. 5 configured in accordance with one embodiment of the present invention.

Another implementation of the system is to determine which illuminant has the highest number of its respective conditions asserted, and determine the most probable illuminant in a discriminant computation. FIG. 9 illustrates a winner-takes-all (WTA) type of illuminant condition log unit 900. The unit contains a set of registers 902 and an associated set of output transistors 904, sending output to a gate 906. These transistors are not used as part of the NAND gate, but instead supply currents which are summed and are input to the WTA computation unit. An additional bias value could also be used to set the current level for each transistor. A logical NOT gate 914 is coupled to the input of set of registers 902. Other illuminant condition logs are connected to illuminant condition log 900 through a transistor 910 and a transistor 912. These transistors make up one element of the WTA computation. There are as many elements as there are condition logs and thus as many as the number of possible illuminants. In addition, a WTA bias circuit 908 is used to bias the system as needed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for determining a type of an illuminant comprising:
    a spectrum diffraction unit;
    a sensor coupled to said spectrum diffraction unit; and,
    an illuminant discrimination unit coupled to said sensor to receive a set of analog signals representative of a set of spectral components, respectively, in said illuminant and to determine said type, wherein said illuminant discrimination unit includes a set of analog signal scaling and negating units to receive the set of signals, respectively, from said sensor, wherein each analog signal scaling and negating unit is coupled to receive a control signal and selectively applies scaling and/or negating upon its respective analog signal based on the control signal, the analog signal scaling and negating units coupled to a comparison bus, an analog comparison unit coupled to said comparison bus to generate a set of binary comparison results, and a set of illuminant condition log units coupled to said comparison unit to store the set of comparison results and to evaluate a final decision as to illuminant type based on whether predefined illuminant discrimination conditions are met.

2. The apparatus of claim 1, wherein said illuminant discrimination unit further comprises a control circuit for routing each comparison result in said set of comparison results into said set of illuminant condition log units.

3. The apparatus of claim 1, wherein said set of signals received from said sensor by said set of signal scaling and negating units is a set of currents.

4. The apparatus of claim 1, wherein said set of signals received from said sensor by said set of signal scaling and negating units is a set of voltages.

5. The apparatus of claim 1, wherein said set of illumination condition log units comprises a set of shift registers, one for each type of illuminant to be detected, wherein each shift register has bits numbering at least the number of conditions needed to discriminate its type of illuminant.

6. An imaging system comprising:
    a personal computer host interface and a local user interface;
    a system controller coupled to the host and local user interfaces to receive user input for managing operation of the system; and,
    an image sensor coupled to said system controller for determining a type of an illuminant, independent of the information on an active imaging area of the sensor and before image capture pre-metering, said image sensor including a spectrum diffraction unit, a plurality of sensing elements coupled to said spectrum diffraction unit and an illuminant discrimination unit coupled to said plurality of sensing elements, respectively, to receive a plurality of signals representative of a plurality of spectral components, respectively, and to determine said type, wherein said illuminant discrimination unit includes a plurality of analog signal processing units to receive the plurality of signals, respectively, each unit to receive control signals that determine any scaling and/or negating to be applied upon its respective analog signal and being coupled to an analog comparison unit, and a set of illuminant condition log units, one for each type of illuminant to be detected, coupled to said comparison unit to store a set of binary comparison results and to evaluate a final decision as to illuminant type based on whether pre-defined illuminant discrimination conditions are met.

7. The apparatus of claim 6, wherein said illuminant discrimination unit further comprises a control circuit for routing each comparison result in said set of comparison results into said set of illuminant condition log units.

8. The apparatus of claim 6, wherein said plurality of signals received from said plurality of sensor elements by said set of signal processing units are currents.

9. The apparatus of claim 6, wherein said plurality of signals received from said plurality of sensor elements by said signal processing units are voltages.

10. The apparatus of claim 6, wherein said set of illumination log units comprises a set of shift registers, one for each type of illuminant to be determined, wherein each register has bits that are as many as the number of conditions needed to discriminate its type of illuminant.

11. A method for detecting an illuminant type comprising:

diffracting light from an illuminant;

generating a plurality of analog signals based on the diffracted light, each signal being representative of a different part of the spectrum of said light;

selectively applying scaling and/or negating to the plurality of analog signals in accordance with a plurality of illuminant identification parameters;

performing comparisons, in one of continuous time current mode and sampled voltage mode, between the applied analog signals, in accordance with the illuminant identification parameters, to evaluate a plurality of conditions that are to be used to determine a plurality of different types of illuminant; and shifting a plurality of bits representative of the plurality of conditions, respectively, into some of a plurality of shift registers, one for each type of illuminant to be determined, wherein an output code that is based on outputs of said plurality of shift registers indicates which of the plurality of different types of illuminant has been detected.

12. The method of claim 11 wherein all operations are performed prior to the end of pre-metering for image capture.

* * * * *